(12) United States Patent
Briand et al.

(10) Patent No.: US 6,810,145 B2
(45) Date of Patent: Oct. 26, 2004

(54) PROCESS FOR DETECTING A CHANGE OF SHOT IN A SUCCESSION OF VIDEO IMAGES

(75) Inventors: Gérard Briand, Ploufragan (FR); Jean-Yves Babonneau, Le Rheu (FR); Alain Verdier, Vern sur Seiche (FR)

(73) Assignee: Thomson Licensing, S.A., Boulogne-Billancourt (FR)

( * ) Notice: Subject to any disclaimer, the term of this patent is extended or adjusted under 35 U.S.C. 154(b) by 612 days.

(21) Appl. No.: 09/825,683

(22) Filed: Apr. 4, 2001

(65) Prior Publication Data

US 2001/0036313 A1 Nov. 1, 2001

(30) Foreign Application Priority Data

Apr. 17, 2000 (FR) .............................................. 00 05064

(51) Int. Cl.⁷ ................................................ G06K 9/00
(52) U.S. Cl. ..................................... 382/170; 348/700
(58) Field of Search ................................. 382/165, 168, 382/170, 171, 236, 107; 345/723; 348/155, 700; 375/240.16

(56) References Cited

U.S. PATENT DOCUMENTS

| | | | | |
|---|---|---|---|---|
| 5,801,765 A | * | 9/1998 | Gotoh et al. ................. | 348/155 |
| 5,805,733 A | | 9/1998 | Wang et al. ................. | 382/232 |
| 5,805,746 A | | 9/1998 | Miyatake et al. ........... | 382/305 |
| 5,900,919 A | * | 5/1999 | Chen et al. .................. | 348/700 |
| 5,956,026 A | | 9/1999 | Ratakonda ................... | 345/328 |
| 6,393,054 B1 | * | 5/2002 | Altunbasak et al. ........ | 375/240 |

FOREIGN PATENT DOCUMENTS

| | | | | |
|---|---|---|---|---|
| EP | 0690413 A2 | 1/1996 | ............. | G06T/7/20 |
| EP | 0990996 A2 | 4/2000 | ............ | G06F/17/30 |
| WO | WO99/31605 | 6/1999 | ........... | G06F/17/30 |
| WO | WO99/41684 | 9/1999 | ........... | G06F/17/30 |

OTHER PUBLICATIONS

Gargi et al., "Peformance Characterization of Video–Shot–Change detection Methods," IEEE Transactions on Circuits and Systems for Video Technology, vol. 10, No. 1, Feb. 2000, pp. 1–13.*

Fernando et al., "Fade–in and Fade–out detection in Video Sequences using Histograms," IEEE International Symposium on Circuits and Systems, May 2000, pp. IV709–IV712.*

Dailianas et al., "Comparison of Automatic Video Segmentation Algorithms," Proc. Integration Issues in Large Commercial Media Delivery Systems, vol. SPIE 2615, Oct. 1995, pp. 2–16.*

* cited by examiner

*Primary Examiner*—Timothy M. Johnson
*Assistant Examiner*—Yubin Hung
(74) *Attorney, Agent, or Firm*—Joseph S. Tripoli; Harvey D. Fried; Francis A. Davenport

(57) ABSTRACT

A process comprises a step (2) of creating histograms of an image representing the occurrences of the luminance values as a function of these values. A further step compares (5) a histogram of an image T(t) with a histogram of a previous image T(t−1), and is characterized in that the step of comparing (5) consists of calculating, for an occurrence $histo_{13}$ lum (n,t) corresponding to a luminance value n in the image T(t), the absolute differences between this occurrence and the occurrences histo_lum (n+k, t−1) of the previous image, where K is a natural integer and varies from −K to +K. The process is further characterized by choosing the minimum value Min_Diff (n, t) from among these differences, and is characterized further by in summing (6) the minimum values for the set of luminance values of the histogram, and comparing (7) the sum obtained with a threshold.

9 Claims, 1 Drawing Sheet

PROCESS FOR DETECTING A CHANGE OF SHOT IN A SUCCESSION OF VIDEO IMAGES

FIELD OF THE INVENTION

The invention relates to a process and device for detecting a change of shot in a succession of video images, commonly referred to as a "cut".

BACKGROUND OF THE INVENTION

The need to tag such changes of shot in an audio-visual sequence arises in particular in frame tempo conversion applications where temporal filtering is generally used. When two consecutive frames are no longer correlated, this filtering is no longer desirable. A prior detection of this change of shot thus makes it possible to utilize another type of interpolation, for example a frame repetition, thus avoiding an inconsistent mix.

Extraction of indexing parameters for video content, segmentation by video shot utilizing prior detection of transitions are also applications of the invention.

The known processes for detecting a change of shot in a video sequence generally rely on the difference in histograms of luminance between the two consecutive frames considered. The principle is therefore based on the variation in luminance from one shot to the next. This type of detector is very sensitive to the variations in luminance which may occur independently of the changes of scene and is not therefore very reliable.

The aim of the invention is to alleviate the aforesaid drawbacks.

SUMMARY OF THE INVENTION

Its object is a process for detecting a change of shot in a succession of video images, comprising a step of creating histograms of an image representing the occurrences of the luminance values as a function of these values, a step of comparing a histogram of an image T(t) with a histogram of a previous image T(t−1), characterized in that the step of comparing consists:

- in calculating, for an occurrence histo_lum (n,t) corresponding to a luminance value n in the image T(t), the absolute differences between this occurrence and the occurrences histo_lum (n+k,t−1) of the previous image, k varying from −K to +K, K being a natural integer,
- in choosing the minimum value Min_Diff (n,t) from among these differences,
- in summing the minimum values for the set of luminance values of the histogram,
- in comparing the sum obtained with a threshold.

According to a particular embodiment, the process performs, before the comparing step, a step of filtering the histograms carrying out an averaging of an occurrence relating to a given luminance value n on the basis of occurrences of neighbouring luminance values, the comparing step being performed on the filtered histograms.

One application relates to a process of audio-visual indexation for the extraction of parameters for indexing sequences, this indexation process being characterized in that it comprises a step of detecting a change of shot according to the process of the invention.

The process proposed, although also relying on a histogram difference, makes it possible to absorb variations in luminance which may give rise to false detections. The origins of these variations may typically stem from a zoom, from tracking, for example when entering a shadier zone, from a slight camera movement, etc.

The process proposed is more reliable, more effective and simpler to implement. The corresponding device, which is very economical, can very easily be inserted into mass market apparatus. It is in fact a very good compromise between complexity of construction and effectiveness.

This process can also be part of a more sophisticated audio-visual indexation system for which it may constitute a basic algorithmic block. It may be supplemented with other analysis layers enabling detection to be rendered still more robust.

BRIEF DESCRIPTION OF THE DRAWING

The characteristics and advantages of the present invention will be more clearly apparent from the following description given by way of example and with reference to FIG. 1 which represents the various steps of the process.

DETAILED DESCRIPTION OF PREFERRED EMBODIMENTS

Figure 1:
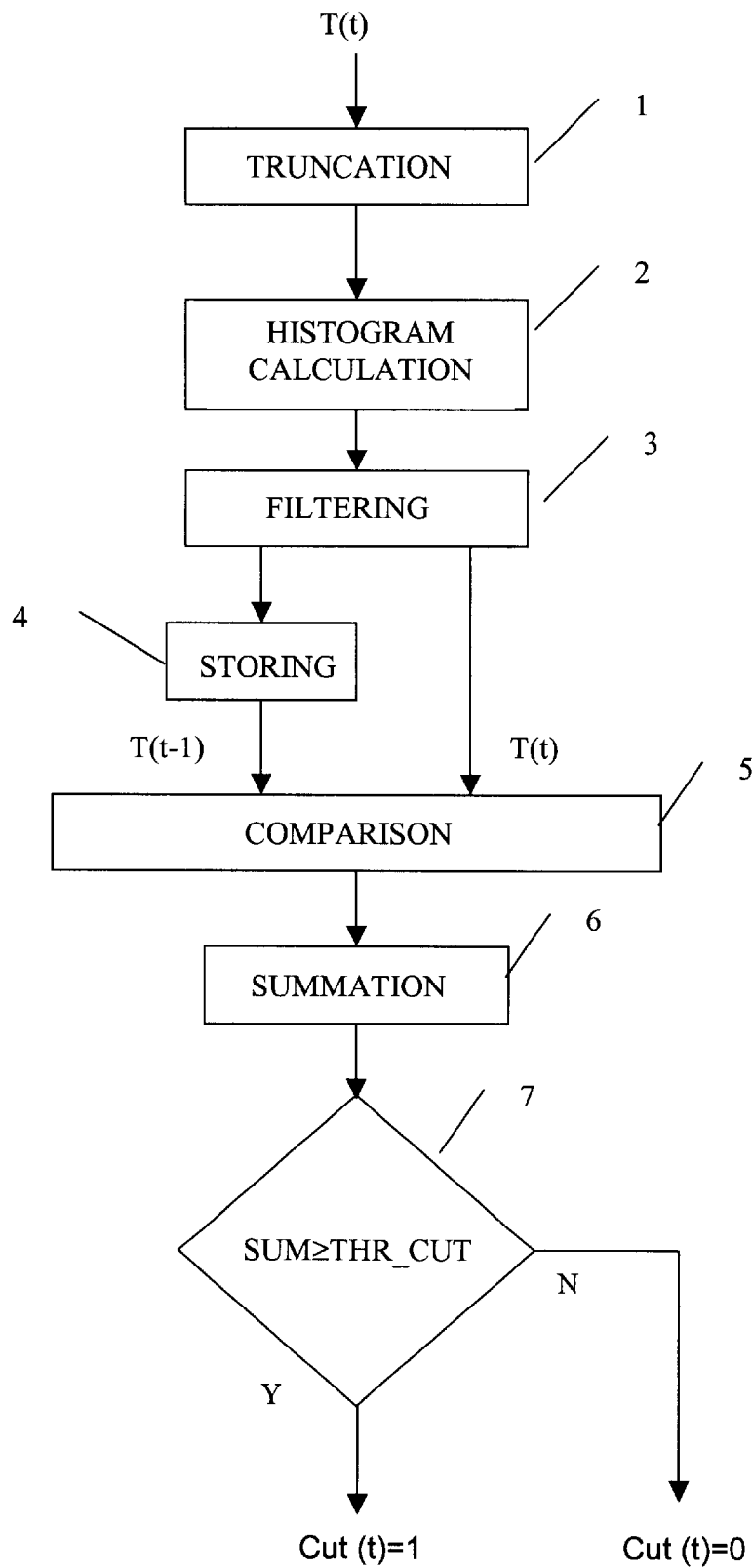

A first step 1 processes the video information relating to a frame at the instant t, T(t). The luminance values of each pixel of the frame are brought to an accuracy of 6 bits by simple truncation of the two lowest-order bits.

A luminance histogram HISTO_LUM [0 . . . 63, t] is compiled in the next step 2 on these luminance values of the frame at the instant t. This histogram contains 64 different values ranging from 0 to 63.

The next step 3 carries out a filtering of the luminance histograms. A monodimensional filter is applied to the elements of the histograms. This filter helps to compensate for the parasitic effects which give rise to spurious variations in luminance.

Let HISTO_LUM [n,t] be the number of occurrences, in the histogram relating to the frame T(t), of the luminance value n or, stated otherwise, the number of pixels in the frame T(t) having the value n.

The filtering or smoothing of the histogram is carried out for example by averaging the occurrence relating to a luminance value n, over 2N+1 values. These values are, in addition to the occurrence considered, the occurrences of the neighbouring luminance values, namely the N values before and after n. For the luminance values which are located a distance less than N from the extreme values 0 and 63, the filtered value may be the original value.

By considering for example an average over 5 values (N=2), the smoothed value of the occurrence relating to the luminance value n, histo_lum(n,t), is equal to:

$$\text{histo\_lum}(n, t) = \frac{1}{5} \times \sum_{k=-2}^{K=+2} \text{HISTO\_LUM}(n+k, t)$$

The value N defining the width of the filter is greater than or equal to one, the filter pertaining to at least three elements. It is all the greater the larger the filtering desired.

The luminance histogram is calculated for each new frame. The filtered histogram of the current frame histo_lum [0 . . . 63, (t)], is stored in step 4.

The filtered histogram of the previous frame histo_lum [0 . . . 63, (t−1)] which had been stored in step 4 when processing this previous frame T(t−1) is transmitted to step 5 which also receives the filtered histogram of the current frame T(t) stemming directly from step 3.

Step 5 then carries out a comparison between the two histograms according to the process of the invention, so as to obtain a minimum difference for each element n of the histogram.

Each element (or sample) histo_lum(n,t) of the histogram in the current frame is compared with its counterpart histo_lum(n,t−1) and with the neighbouring elements histo(n+k, t−1) of this counterpart in the previous frame so as to provide differences, the minimum difference Min_Dif(n,t) being chosen.

We thus have, for the differencing of the two histograms:

for $0 + K \leq n \leq 63 - K$ $$\text{Min\_Dif}(n, t) = \underset{k=-K}{\overset{k=+K}{\text{Min}}} \{\text{Abs}(\text{histo\_lum}(n, t) - \text{histo\_lum}(n + k, t - 1))\}$$

for $n < 0 + K$ or $63 - K < n$

−Min_Dif(n,t)=Abs(histo_lum(n,t)−histo_lum(n,t−1))
K is a natural integer, Abs corresponds to the absolute value.

Stated otherwise, for the luminance values which are a distance of less than K from the extreme values 0 and 63, the calculated value Min_Dif(n,t) is the absolute value of the differences of the filtered values.

The next step 6 of the processing consists in summing, over the set of elements of the histogram of the current frame, the minimum differences obtained Min_Dif(n,t):

$$\text{Sum}(t) = \sum_{n=0}^{n=63} \text{Min\_Dif}(n, t)$$

Step 7 carries out a comparison between the value obtained Sum(t) for the frame T(t) and a predetermined threshold Thr_cut.

Si Sum(t)≧Thr_Cut, then the frame T(t) is considered to correspond to a sequence cut:

Cut(t)=1 if Sum (t)<Thr_Cut, there is then considered to be no cut:

Cut(t)=0

The value of the detection threshold Thr_cut is fixed, in an empirical manner, at around ⅕ of the number of points contained in a frame. For example, for an SDTV frame of 720×288 useful pixels, the value of the threshold Thr_Cut is taken equal to 40 000.

Thus, if the sum calculated is greater than a predetermined threshold, test performed in step 7, a change of shot is declared between the two frames considered and a first output (Y) is activated. In the converse case, a second activated output (N) indicates that there is no change of shot.

The calculation of the value Min_Dif is tied to a predetermined value K. The bigger the value chosen for K, the more the system will be capable of absorbing big variations in luminance but this will be achieved to the detriment of the sensitivity of the detector as regards true changes of shot, thus possibly leading to failures in detection.

Experience has shown that by choosing K=1, the system behaves effectively. It then detects 95% of the changes of shot and produces around 10% of false detections. These seemingly numerous false detections encompass ambiguous situations of the scene which are regarded, by the automatic detection systems, as changes of shot. These situations are generally catalogued and can be easily identified by complementary analysis systems which are responsible for rejecting them so as to clean up the results. These ancillary tools relating to the detection of these typical situations, that is to say known situations, thus make it possible to improve the performance of our process.

The undetected changes of shot can be reduced by altering the value of K but to the detriment of the false detections which would become more numerous. According to the application envisaged and also according to the tools associated with this detector, the advantage will be given to the detection rate or to the false detection.

For example, in the case of a frame tempo conversion, it is desirable to limit the false detections since they lead to a specific interpolation which may give rise to visible jerks.

In respect to an application for segmenting a video sequence into shots, an excess of detections will not be critical since the detector will be followed by complementary analyses making it possible to reject the surplus detections.

The filtering performed before the differencing, on 2N+1 samples, makes it possible to absorb the small variations in luminance which are manifested as a propagation towards neighbouring samples, from one image to another. It therefore allows better differentiation of the variations in luminance which are due to a sequence cut and are therefore entirely random within the image, variations in luminance due to the movements within the scene. These latter variations are generally manifested as a propagation of the samples towards neighbouring values as a function of the evolution of the areas of the zones concerned, of the appearance or disappearance of zones, of the variations in luminance, these evolutions and variations generally occurring in a progressive manner. It is in fact a shape of histogram, hence a filtered histogram, which must be taken into account, in order to be compared with another, rather than specific values of histograms. Indeed, even if they vary little from one image to another, these values may provide a big sum of variations which may lead to a false detection of a cut.

Several differences are calculated, one on the basis of the same value of luminance of the previous image, the others on the basis of neighbouring values and it is the minimum value which is taken into account. By choosing the minimum value in a neighbourhood of samples it is possible to circumvent false detections. Indeed, during a cut of sequence, the histogram peaks change position completely whereas in other cases it is rather more a matter of a slow evolution of these histogram peaks from one luminance value to another. There is a transfer of the luminance values towards neighbouring samples of the histogram for example during slow variations in lighting, during tracking, etc. By taking neighbouring samples into account it is possible to circumvent this transfer, to a certain extent depending on the number of neighbouring samples.

It may also be added that a preponderant variation in the gradient of the luminance in the image, from one image to another, for example during fading or overexposure, is accumulated over a large number of luminance samples and hence over the summation which is performed on the differences. Choosing a minimum value makes it possible to be less sensitive to such overall variations in luminance within the image.

The applications of the process according to the invention relate to image coding and compression devices and also to segmentation by video shots, the extraction of parameters for the indexing of sequences. The process makes it possible to detect the various sequences, for example in a film or a succession of films, so making it possible, for each of them and according to known processes, to extract one or more recognition or identification parameters. For example, an audio-visual indexation process can comprise a step of detecting sequences according to the process of the invention.

Obviously, the calculations described earlier may relate to a succession of images, or frames and relate to any type of standard or coding.

A coding or video data compression device comprising a circuit implementing the process described earlier also forms part of the field of the invention.

What is claimed is:

1. Process for detecting a change of shot in a succession of video images, comprising:

creating histograms of an image representing the occurrences of luminance values as a function of these values;

comparing a histogram of an image T(t) with a histogram of a previous image T(t−1), wherein the step of comparing consists ± of;

calculating, for an occurrence histo_lum (n,t) corresponding to a luminance value n in the image T(t), the absolute differences between this occurrence and the occurrences histo_lum (n+k, t−1) of the previous image, k varying from −K to +K, K being a natural integer;

choosing the minimum value Min_Diff (n, t) from among these differences, summing the minimum values for the set of luminance values of the histogram; and comparing the sum obtained with a threshold.

2. Process according to claim 1, comprising, before the comparing step a step of filtering the histograms carrying out an averaging of an occurrence relating to a given luminance value n on the basis of occurrences of neighbouring luminance values, the comparing step being performed on the filtered histograms.

3. Process according to claim 2, wherein the neighbouring luminance values are the two values below and the two values above the luminance value n.

4. Process according to claim 2, wherein the occurrences corresponding to extreme luminance values are not averaged.

5. Process according to claim 1, wherein the threshold value to which the sum obtained is compared, is substantially equal to ⅕ of the number of points contained in an image.

6. Process according to claim 1, comprising a step of truncation of the luminance values before the calculation of the histograms.

7. Process according to claim 1, wherein the value of K is equal to 1.

8. Process of audio-visual indexation for the extraction of parameters for indexing sequences, comprising a step of detecting a change of shot according to the process of claim 1.

9. Video coding device, comprising a circuit for detecting a change of shot implementing the process of claim 1.

* * * * *